US009446545B2

(12) United States Patent
Inami et al.

(10) Patent No.: US 9,446,545 B2
(45) Date of Patent: Sep. 20, 2016

(54) INJECTION DEVICE, MOLDING MACHINE, AND METHOD FOR CONTROLLING INJECTION DEVICE

(71) Applicant: Toshiba Kikai Kabushiki Kaisha, Tokyo (JP)

(72) Inventors: Harunobu Inami, Numazu (JP); Keisuke Mori, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 461 days.

(21) Appl. No.: 14/029,316

(22) Filed: Sep. 17, 2013

(65) Prior Publication Data
US 2014/0088757 A1    Mar. 27, 2014

Related U.S. Application Data

(63) Continuation of application No. PCT/JP2012/056746, filed on Mar. 15, 2012.

(30) Foreign Application Priority Data

Mar. 18, 2011    (JP) ................................. 2011-061539

(51) Int. Cl.
*G06F 19/00*    (2011.01)
*B29C 45/77*    (2006.01)
*B29C 45/50*    (2006.01)

(52) U.S. Cl.
CPC ........... *B29C 45/77* (2013.01); *B29C 45/5008* (2013.01); *B29C 2045/5032* (2013.01); *B29C 2045/5056* (2013.01); *B29C 2945/76013* (2013.01)

(58) Field of Classification Search
CPC ............ B29C 2045/5056; B29C 2945/76505; B29C 2945/76013; B29C 45/5008; B29C 45/77
See application file for complete search history.

(56) References Cited

U.S. PATENT DOCUMENTS 6,157,158 A * 12/2000 Ishikawa ................. B29C 45/66
264/40.5
6,386,853 B1 * 5/2002 Mizuno ............... B29C 45/5008
425/145

(Continued)

FOREIGN PATENT DOCUMENTS

CN          1683142       10/2005
JP        2000-108175      4/2000

(Continued)

OTHER PUBLICATIONS

Bozzelli, John—"Troubleshooting: Injection MOlding, How to Solve Uneven Clamping", Plastics Technology, www.PTOnline.com, Apr. 2009.*

(Continued)

*Primary Examiner* — Michael D Masinick
(74) *Attorney, Agent, or Firm* — DLA Piper LLP US

(57) ABSTRACT

An injection device is provided with a stationary-side frame supporting a barrel, a movable-side frame rotatably supporting a screw, a pair of ball screws, and injection drive mechanisms includes servomotors configured to rotate the ball screws. A force detector such as a load cell and the like is disposed between the first ball screw and the movable-side frame. A dummy member is disposed between the second ball screw and the movable-side frame. A control unit controls the first injection drive mechanism based on the output of the force detector and controls the second injection drive mechanism based on the output of the force detector and an arithmetic operation performed in consideration of the respective spring constants of the force detector and the dummy member.

6 Claims, 6 Drawing Sheets

(56) References Cited

U.S. PATENT DOCUMENTS

| | | | |
|---|---|---|---|
| 7,635,259 B2 * | 12/2009 | Tanaka | B29C 45/1747 425/149 |
| 2005/0244537 A1 * | 11/2005 | Uchiyama | B29C 45/1751 425/593 |
| 2008/0124419 A1 * | 5/2008 | Tanaka | B29C 45/1747 425/170 |
| 2009/0246306 A1 | 10/2009 | Yoshiba et al. | |

FOREIGN PATENT DOCUMENTS

| | | |
|---|---|---|
| JP | 2002-321264 | 11/2002 |
| JP | 2003-200469 | 7/2003 |
| JP | 2005-178285 | 7/2005 |
| JP | 2007-136961 | 6/2007 |
| JP | 2010-111019 | 5/2010 |

OTHER PUBLICATIONS

International Search Report issued in PCT/JP2012/056746 dated Apr. 10, 2013.
English Language Translation for International Search Report issued in PCT/JP2012/056746 dated Apr. 10, 2013.
English Language Abstract and Translation for JP 2007-136961 published on Jun. 7, 2007.
English Language Abstract and Translation for JP 2005-178285 published on Jul. 7, 2005.
English Language Abstract and Translation for JP 2003-200469 published on Jul. 15, 2003.
English Language Abstract and Translation for JP 2002-321264 published on Nov. 11, 2002.
English Language Abstract and Translation for JP 2000-108175 published on Apr. 18, 2000.
International Preliminary Examination Report on Patentability and Written Opinion issued in PCT/JP/2012/056746 on Oct. 3, 2013.
Chinese Office Action issued in CN 201280013825.6 dated Apr. 28, 2014.
English Language Chinese Office Action issued in CN 201280013825.6 dated Apr. 28, 2014.
English Language Abstract for CN 1683142 published Oct. 19, 2005.
English Language Abstract and Translation for JP 2010-111019 published May 20, 2010.

* cited by examiner

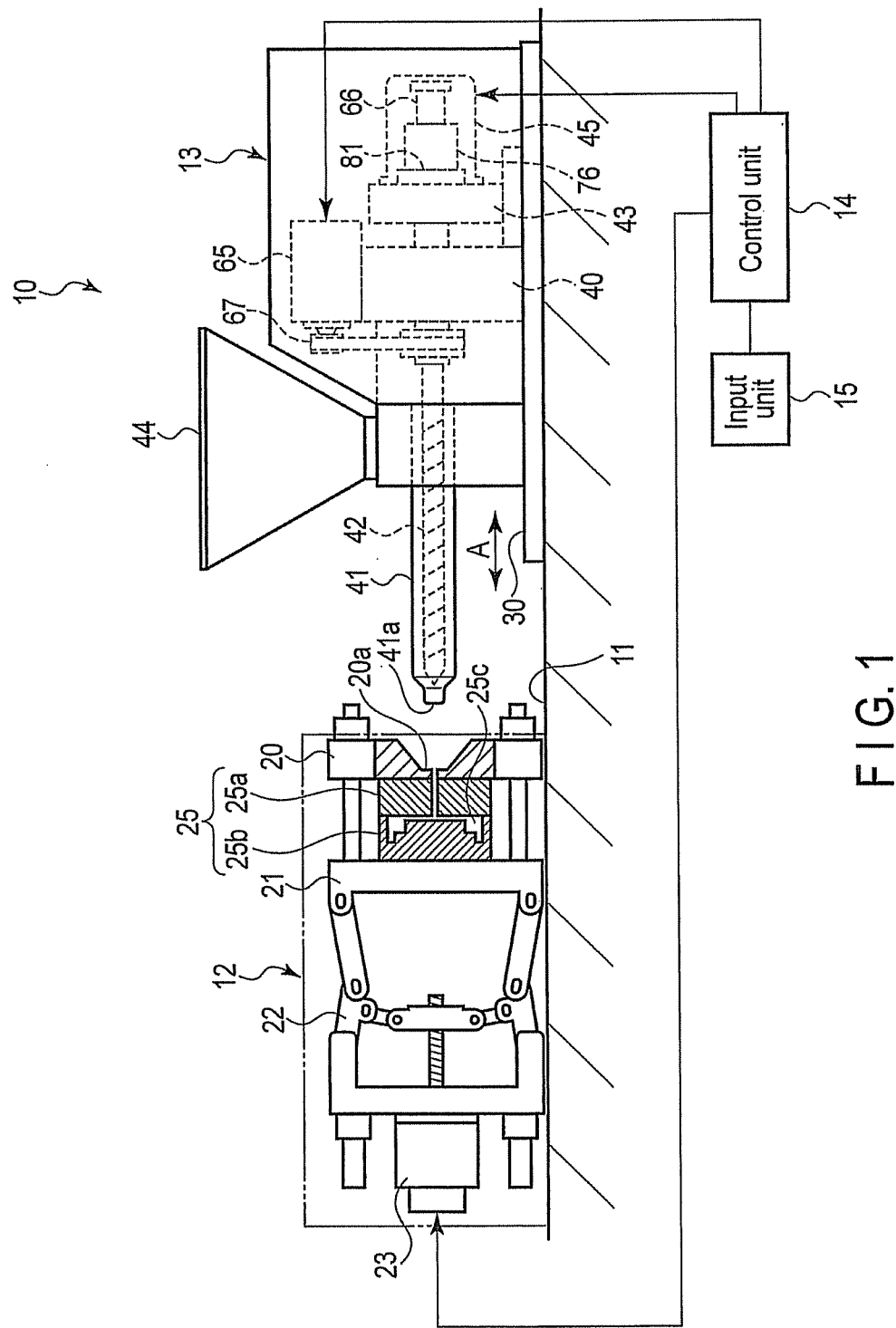
F I G. 1

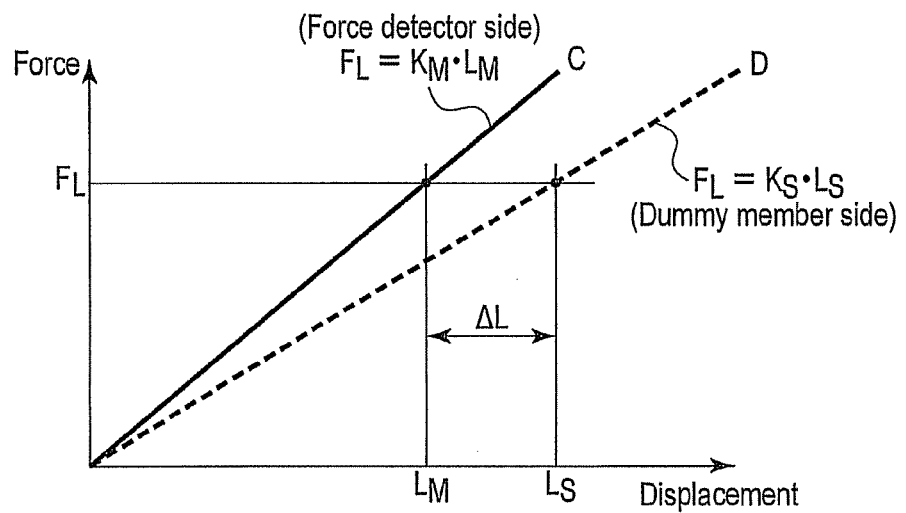
F I G. 3
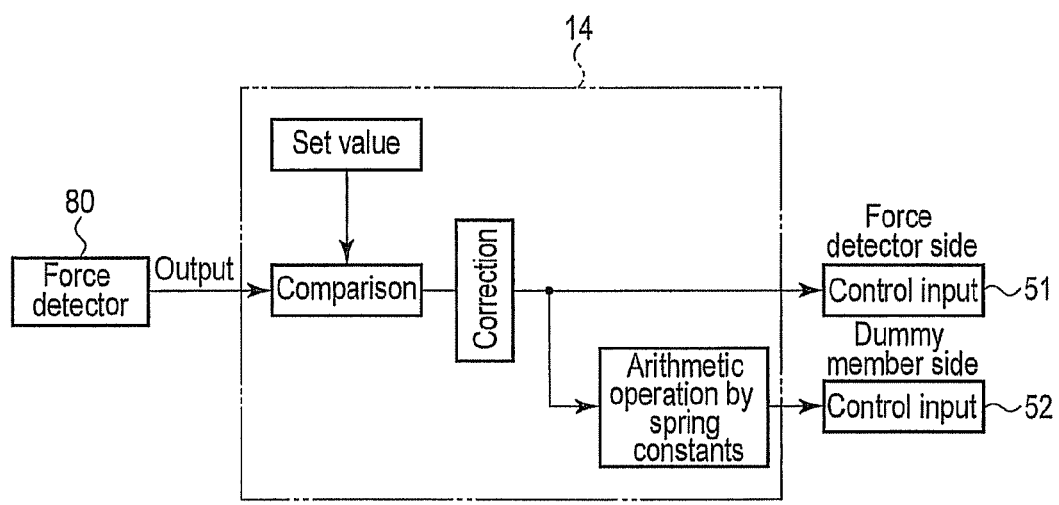
F I G. 4

INJECTION DEVICE, MOLDING MACHINE, AND METHOD FOR CONTROLLING INJECTION DEVICE

CROSS REFERENCE TO RELATED APPLICATIONS

This application is a Continuation Application of PCT Application No. PCT/JP2012/056746, filed Mar. 15, 2012 and based upon and claiming the benefit of priority from prior Japanese Patent Application No. 2011-061539, filed Mar. 18, 2011, the entire contents of all of which are incorporated herein by reference.

BACKGROUND OF THE INVENTION

1. Field of the Invention

The present invention relates to an electric injection device used in an injection molding machine, die-cast molding machine, etc., a molding machine, and a control method for the injection device.

2. Description of the Related Art

Molding machines using molds (stationary and movable molds), such as injection molding machines, die-cast molding machines, etc., are configured to efficiently manufacture molded articles by repeating a series of molding cycles, including mold closing, injection, dwelling, mold opening, etc., in a predetermined order, based on a sequential program stored in a control unit. A molding machine of this type comprises an injection device for injecting a material into a mold and a mold clamping device configured to open and close the mold.

The injection device of an injection molding machine comprises a barrel configured to, for example, heat and melt a material, a screw inserted into the barrel, a screw rotation mechanism configured to rotate the screw, an injection drive mechanism configured to move the screw in the axial direction of the barrel, etc. The barrel is supported by a stationary-side frame, and the screw is rotatably supported by a movable-side frame. This movable-side frame is configured to be movable relative to the stationary-side frame in the axial direction of the screw by the injection drive mechanism. The electric injection drive mechanism comprises a ball screw, a servomotor for rotating the ball screw, a force transmission unit configured to transmit a thrust obtained by the rotation of the ball screw to the movable-side frame, etc.

On the other hand, the injection device of a die-cast molding machine comprises, for example, an injection unit comprising an injection sleeve supplied with a molten material by a pouring device, an injection plunger (extrusion member) inserted into the injection sleeve, a drive mechanism configured to advance and retreat the injection plunger, etc.

A twin-ball-screw injection device with a pair of ball screws comprises a pair of servomotors for rotating the ball screws individually, a pair of load cells configured to detect forces applied to respective force transmission units of the ball screws, etc. The twin-ball-screw injection device is advantageous in that it can obtain a high injection pressure and that loads on the individual servomotors, ball screws are low, and so on. However, the twin-ball-screw injection device has the problem of higher costs than those of a single-ball-screw injection device that uses only a single ball screw and single load cell.

To reduce the costs of the twin-ball-screw injection device, therefore, a proposal is made to use a load cell for the force transmission unit of one ball screw and a dummy load cell for the force transmission unit of the other ball screw, as disclosed in the following Patent Documents 1 to 3.

In an injection molding machine of Patent Document 1, for example, an injection pressure applied to each ball screw is calculated based on the ratio between the distance from one ball screw shaft on which the load cell is disposed to the central axis of the screw and the distance from the other ball screw shaft on which the dummy load cell is disposed to the central axis of the screw. According to an injection molding machine of Patent Document 2, an injection pressure is calculated by doubling an output from a pressure sensor (load cell) disposed on the one ball screw. According to an injection molding machine of Patent Document 3, a back pressure is detected by arithmetically processing the output of a pressure detecting sensor (load cell) disposed on the one ball screw, thereby achieving cost reduction.

PRIOR ART DOCUMENT

Patent Document

Patent Document 1: Jpn. Pat. Appln. KOKAI Publication No. 2003-200469
Patent Document 2: Jpn. Pat. Appln. KOKAI Publication No. 2000-108175
Patent Document 3: Jpn. Pat. Appln. KOKAI Publication No. 2002-321264

BRIEF SUMMARY OF THE INVENTION

Problem to be Solved by the Invention

Although the body of a load cell and a dummy load cell are both made of a highly rigid metal, such as spring steel or titanium alloy, they are slightly elastically deformed by an injection pressure. The conventional twin-ball-screw injection device described above is based on the premise that the load cell disposed on the one ball screw and the dummy load cell disposed on the other ball screw are equally rigid. Thus, there has been no consideration at all of the respective spring constants of the load cell and dummy load cell.

If the respective spring constants of the load cell and dummy load cell are different from each other, therefore, the respective displacements of the load cell and dummy load cell are inevitably different when an injection pressure is applied. Thus, equal forces cease to act on the pair of ball screws, so that there is a possibility of the one servomotor and ball screw being overloaded.

Accordingly, the object of the present invention is to provide an injection device comprising a force detector, such as a load cell and the like, disposed on the one ball screw and a dummy member, such as a dummy load cell and the like, disposed on the other ball screw, the injection device being configured so that the injection pressure, injection speed, etc., can be accurately controlled.

Means for Solving the Problem

An injection device according to the present invention comprises a stationary-side frame supporting an injection unit, a movable-side frame being movable relative to the stationary-side frame and supporting an extrusion member inserted into the injection unit, first and second ball screws each comprising a ball screw shaft and a ball nut for longitudinally moving the movable-side frame relative to the stationary-side frame, a first injection drive mechanism comprising a first servomotor configured to relatively rotate the ball screw shaft and the ball nut of the first ball screw, a second injection drive mechanism comprising a second servomotor configured to relatively rotate the ball screw shaft and the ball nut of the second ball screw, a first force transmission unit configured to transmit a thrust produced by the relative rotation of the ball screw shaft and the ball nut of the first ball screw to the movable-side frame, a force detector disposed on the first force transmission unit and configured to produce an output corresponding to a force applied to the first force transmission unit, a second force transmission unit configured to transmit a thrust produced by the relative rotation of the ball screw shaft and the ball nut of the second ball screw to the movable-side frame, a dummy member disposed on the second force transmission unit and having such a property as to be deformable depending on a force applied to the second force transmission unit, and a control unit configured to control the first servomotor based on the output of the force detector and control the second servomotor based on the output of the force detector and the property of the dummy member.

An example of the control unit controls the first and second injection drive mechanism so that the forces applied to the first and second force transmission units are equalized, based on the respective spring constants of the force detector and the dummy member. The control unit may control an injection speed within a range where the forces applied to the first and second force transmission units do not exceed a tolerance.

A molding device according to the present invention comprises the injection device and a mold clamping device. The mold clamping device comprises a stationary platen, a movable platen, and an open/close drive unit for moving the movable platen in a mold clamping direction and a mold opening direction.

Effect of the Invention

In the twin-ball-screw injection device comprising the force detector on the one ball screw and the dummy member on the other ball screw, according to the present invention, variation between the force applied to the force transmission unit for the first ball screw on the force detector side and the force applied to the force transmission unit for the second ball screw on the dummy member side can be reduced. Thus, the ball screws and servomotors can be prevented from being overloaded, and the injection pressure, injection speed, etc., can be controlled more accurately.

Since the servomotor on the dummy member side is controlled based on the output from the force detector and the property of the dummy member, moreover, the shape, mass (weight), etc., of the dummy member can be simplified. Consequently, costs can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a front view, partially in section, showing a molding machine according to a first embodiment of the present invention;

FIG. 3 is a diagram showing the relationships between respective displacements and forces of a force detector and dummy member;

FIG. 4 is a diagram showing respective control inputs of the force detector and dummy member;

DETAILED DESCRIPTION OF THE INVENTION

Figure 2:
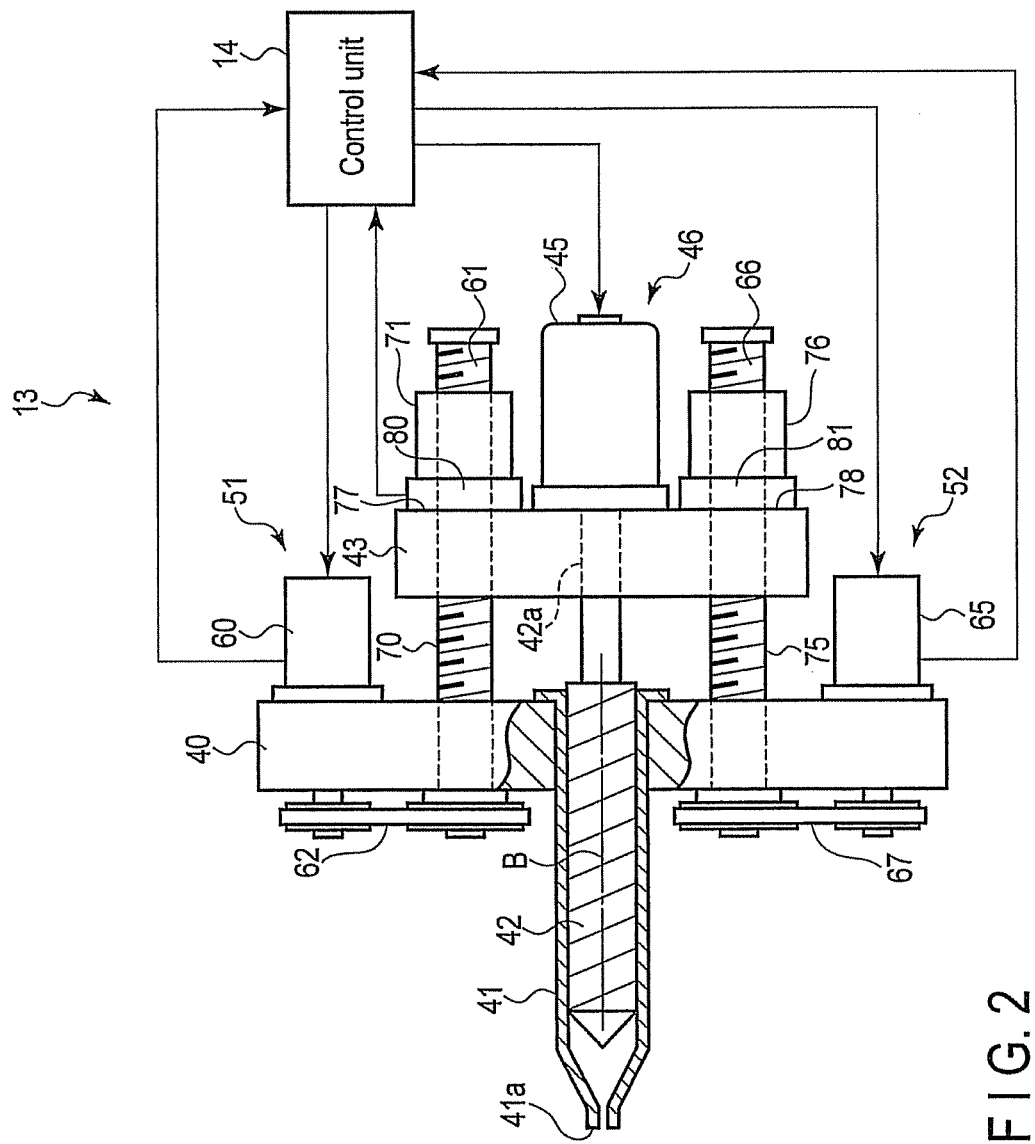
FIG. 2 is a plan view, partially in section, showing part of an injection device of the molding machine shown in FIG. 1.

An injection device of a molding machine according to a first embodiment of the present invention will now be described with reference to FIGS. 1 to 4.

FIG. 1 shows an electric injection molding machine 10 as an example of the molding machine. The injection molding machine 10 will hereinafter be referred to simply as the molding machine 10.

This molding machine 10 comprises a base 11, mold clamping device 12, injection device 13, control unit 14, input unit 15, etc. The mold clamping device 12 and injection device 13 are located on the base 11. The control unit 14 serves as control means for a computer program for controlling molding operation, mold clamping operation, etc., memory, and the like. The input unit 15 serves as a human-machine interface unit. A touch panel, which doubles as a display and an input key pad, and the like are arranged on the input unit 15.

An example of the mold clamping device 12 comprises a stationary platen 20 secured to the base 11, movable platen 21 located opposite the stationary platen 20, link mechanism 22, open/close drive unit 23 that causes the behavior of the link mechanism 22 to advance and retreat the movable platen 21, etc. A stationary mold 25a is mounted on the stationary platen 20, and a movable mold 25b is mounted on the movable platen 21. As the stationary mold 25a and movable mold 25b are joined together, a cavity 25c is formed in a mold 25.

The injection device 13 is located on the base 11 and is movable in the direction indicated by arrow A along a horizontally extending rail 30 (shown in FIG. 1) on the base 11. The injection device 13 can be moved (or advanced and retreated) in the direction of arrow A by a nozzle touch drive mechanism, which is not shown.

FIG. 2 is a plan view, partially section, showing the injection device 13. The injection device 13 comprises a stationary-side frame 40, barrel 41 serving as an injection unit, screw 42 serving as an extrusion member, movable-side frame 43, and hopper 44 that supplies a material to the barrel 41. The barrel 41 is supported by the stationary-side frame 40. The barrel 41 is an example of the injection unit. The screw 42 is rotatably inserted into the barrel 41 and is movable in the direction of an axis B (shown in FIG. 2) of the barrel 41. The screw 42 is an example of the extrusion member. The movable-side frame 43 can move relative to the stationary-side frame 40 in the direction of the axis B.

A nozzle 41a is disposed on the distal end of the barrel 41. The mold clamping device 12 is located in front of the nozzle 41a. In this specification, the advance of the movable-side frame 43 implies a movement of the movable-side frame 43 toward the stationary-side frame 40. The retreat of the movable-side frame 43 implies a movement of the movable-side frame 43 away from the stationary-side frame 40.

This injection device 13 comprises a screw rotation mechanism 46 comprising a servomotor 45, first and second injection drive mechanisms 51 and 52, heater (not shown) for heating the material, etc. A proximal portion 42a of the screw 42 is rotatably supported by the movable-side frame 43. Servomotor 45 of the screw rotation mechanism 46 rotates the screw 42. The rotation of servomotor 45 is controlled by the control unit 14. The first and second injection drive mechanisms 51 and 52 move the screw 42 in the direction of the axis B.

The first injection drive mechanism 51 comprises a first servomotor 60 disposed on the stationary-side frame 40, first ball screw 61, rotation transmission mechanism 62, etc. The rotation transmission mechanism 62 transmits the rotation of servomotor 60 to the ball screw 61. Here, the amount of rotation of the first ball screw 61 can be determined by means of a position sensor (not shown), such as an encoder and the like disposed in servomotor 60 and configured to detect the amount of rotation of servomotor 60, and by arithmetic processing in the control unit 14. Further, the first injection drive mechanism 51 may comprise a position sensor (not shown), such as an encoder and the like configured to detect the amount of rotation of the first ball screw 61.

The second injection drive mechanism 52 comprises a second servomotor 65 disposed on the stationary-side frame 40, second ball screw 66, rotation transmission mechanism 67, etc. The rotation transmission mechanism 67 transmits the rotation of servomotor 65 to ball screw 66. Here, the amount of rotation of the second ball screw 66 can be determined by means of a position sensor (not shown), such as an encoder and the like disposed in servomotor 65 and configured to detect the amount of rotation of servomotor 65, and by arithmetic processing in the control unit 14. Further, the second injection drive mechanism 52 may comprise a position sensor (not shown), such as an encoder and the like configured to detect the amount of rotation of the second ball screw 66.

These servomotors 60 and 65, ball screws 61 and 66, etc., constitute the twin-ball-screw injection device 13. The respective rotations of servomotors 60 and 65 are controlled by the control unit 14. If the position sensors are used to detect the respective amounts of rotation of ball screws 61 and 66, moreover, detection signals from the position sensors are input to the control unit 14.

The first ball screw 61 comprises a ball screw shaft 70, which extends parallel to the axis B, and a ball nut 71. Ball nut 71 is screwed with ball screw shaft 70. The second ball screw 66 also comprises a ball screw shaft 75, which extends parallel to the axis B, and ball nut 76. Ball nut 76 is screwed with ball screw shaft 75.

The first ball screw 61 and second ball screw 66 are individually located so that ball screw shafts 70 and 75 are parallel to each other. When ball screw shafts 70 and 75 are synchronously rotated by servomotors 60 and 65, the movable-side frame 43 moves relative to the stationary-side frame 40 in the direction of the axis B, depending on the amount and direction of rotation.

A first force transmission unit 77 exists between ball nut 71 of the first ball screw 61 and the movable-side frame 43. A thrust produced by the rotation of the first ball screw 61 is transmitted to the movable-side frame 43 through this first force transmission unit 77. A second force transmission unit 78 exists between ball nut 76 of the second ball screw 66 and the movable-side frame 43. A thrust produced by the rotation of the second ball screw 66 is transmitted to the movable-side frame 43 through this second force transmission unit 78.

The positions where the first force transmission unit 77 and the second force transmission unit 78 are disposed are not limited to this embodiment. For example, force transmission units 77 and 78 may be disposed on those parts of ball nuts 71 and 76 which contact the movable-side frame 43. Alternatively, force transmission units 77 and 78 may be disposed on those parts of the movable-side frame 43 which contact ball nuts 71 and 76. Further, depending on the drive system of the movable-side frame 43, for example, (1) in a drive mechanism constructed so that the ball nuts are rotated by the servomotors or the like to axially advance or retreat the ball screw shafts through the relative rotation of the ball nuts, the first and second force transmission units may be disposed in positions where a thrust produced by the relative rotation of the ball nuts is transmitted, or (2) in a drive mechanism constructed so that the ball screw shafts are rotated by the servomotors or the like and the ball nuts are disposed on the stationary frame, whereby the ball screw shafts are axially advanced or retreated together with the movable-side frame, the first and second force transmission units may be disposed in positions where a thrust produced by the relative rotation of the ball screw shafts is transmitted. In short, the force transmission units should only be disposed in positions where the thrust produced by the relative rotation of the ball screw shafts and ball nuts is transmitted.

The first force transmission unit 77 is provided with the force detector 80 having the function of measuring force. An example of the force detector 80 is a load cell. The load cell comprises a body of a highly rigid metal, such as spring steel or titanium alloy and the like, and a strain gauge disposed on the body and outputs an electrical signal corresponding to the magnitude of an applied force (or compression load) to the control unit 14. The force detector 80 may be based on some other detection principle than that of the load cell.

A dummy member (e.g., dummy load cell) 81 is disposed on the second force transmission unit 78. For the purpose of cost reduction and the like, the dummy member 81 is used in a pair with the force detector 80. Generally, in this case, the dummy member 81 is made of substantially the same material as the body of the force detector 80. In this case, moreover, the dummy member 81 is formed having substantially the same shape and size as the body of the force detector 80. Although the force detector 80 and the dummy member 81 are substantially equal in spring constant, therefore, their respective spring constants may possibly be somewhat different from each other. If the dummy member 81 is improved for the purpose of further cost reduction, moreover, the respective spring constants of the force detector 80 and the dummy member 81 may possibly become more or less different as a result of the improvement of the material, shape, size, etc., of the dummy member 81.

If ball screw shaft 70 of the first ball screw 61 rotates relative to ball nut 71, ball nut 71 moves in the direction of the axis B based on the amount of rotation of ball screw shaft 70. Thereupon, a thrust in the direction of the axis B is produced in ball nut 71. This thrust is transmitted to the movable-side frame 43 through the force detector 80.

If ball screw shaft 75 of the second ball screw 66 rotates relative to ball nut 76, on the other hand, ball nut 76 moves in the direction of the axis B based on the amount of rotation of ball screw shaft 75. Thereupon, a thrust in the direction of the axis B is produced in ball nut 76. This thrust is transmitted to the movable-side frame 43 through the dummy member 81. Thus, the movable-side frame 43 moves in the direction of the axis B for a distance corresponding to the amounts of rotation of ball screw shafts 70 and 75.

The injection device 13 constructed in this manner is controlled by the control unit 14. After the nozzle 41*a* is pressed against a material inlet port 20*a* (shown in FIG. 1) of the stationary platen 20, for example, a molten material in the barrel 41 is injected toward the cavity 25*c* of the mold 25 through the nozzle 41*a*. Further, the movable mold 25*b* is opened or closed relative to the stationary mold 25*a* by advancing or retreating the movable platen 21 by means of the mold clamping device 12.

Specifically, a series of molding cycles, including mold closing, injection, dwelling, mold opening, etc., is repeated in a predetermined order, based on a sequential program stored in the control unit 14. At the time of injection, the screw 42 advances relative to the barrel 41 in the direction of the axis B. At the time of metering, the screw 42 retreats relative to the barrel 41 in the direction of the axis B while rotating in the barrel 41.

Here, a force detected by the force detector 80 (output of the force detector 80), spring constant of the force detector 80, and displacement of the force detector 80 are assumed to be $F_L$, $K_M$ and $L_M$, respectively. On the other hand, the spring constant of the dummy member 81 and the displacement of the dummy member 81 are assumed to be $K_S$ and $L_S$, respectively. The following is a description of a case where spring constant $K_M$ of the force detector 80 and spring constant $K_S$ of the dummy member 81 are different from each other.

FIG. 3 shows a case where spring constant $K_M$ of the force detector 80 is higher than spring constant $K_S$ of the dummy member 81. Segment C in FIG. 3 represents the load-deflection characteristic of the force detector 80. Segment D in FIG. 3 represents the load-deflection characteristic of the dummy member 81. Although the difference between the respective load-deflection characteristics of the force detector 80 and dummy member 81 is actually very small, it is shown exaggerated in FIG. 3 for convenience of explanation.

In the first injection drive mechanism 51 comprising the first ball screw 61 and force detector 80, as in the present embodiment, the displacement $L_M$ of the force detector 80 depends on spring constant $K_M$ of the force detector 80. Specifically, according to Hooke's law, the displacement $L_M$ of the force detector 80 is given by $$F_L = K_M \cdot L_M,$$

$$L_M = F_L / K_M.$$

In the second injection drive mechanism 52 comprising the second ball screw 66 and dummy member 81, on the other hand, the displacement $L_S$ of the dummy member 81 depends on spring constant $K_S$ of the dummy member 81. Specifically, according to Hooke's law, the displacement $L_S$ of the dummy member 81 is given by $$F_L = K_S \cdot L_S,$$

$$L_S = F_L / K_S.$$

Thus, a deviation $\Delta L$ between force transmission unit 77 on the side of the force detector 80 and force transmission unit 78 on the side of the dummy member 81 is $$\Delta L = L_M - L_S = (F_L / K_M) - (F_L / K_S) = F_L \cdot \{(1/K_M) - (1/K_S)\}.$$

In order to apply equal forces to the first force transmission unit 77 and second force transmission unit 78, therefore, it is necessary to take account of the difference between the spring constant on the side of the force detector 80 and the spring constant on the side of the dummy member 81, that is, the deviation $\Delta L$. Thus, as regards a command for the second injection drive mechanism 52, the control unit 14 outputs a command for the first injection drive mechanism 51 tempered with the deviation $\Delta L$, as the command for the second injection drive mechanism 52, to servomotor 65. If a command (or control input) on the side of the force detector 80 is X, a command (or control input) on the side of the dummy member 81 is $X - F_L \cdot \{(1/K_M) - (1/K_S)\}$ at the time of both injection and metering.

Thus, the control unit 14 of the injection device 13 of the present embodiment controls servomotor 60 of the first injection drive mechanism 51 based on the output of the force detector 80 and also controls servomotor 65 of the second injection drive mechanism 52 based on the output of the force detector 80 and the difference between respective spring constants $K_M$ and $K_S$ of the force detector 80 and dummy member 81.

As shown in FIG. 4, for example, the output of the force detector 80 is compared with a set value and correction (correction operation) is performed. Further, the respective control inputs of servomotor 60 of the first injection drive mechanism 51 and servomotor 65 of the second injection drive mechanism 52 are calculated by performing an arithmetic operation in consideration of spring constants $K_M$ and $K_S$ of the force detector 80 and dummy member 81. Under this control, the injection speed is controlled to be a set speed.

At the time of injection, the higher the movement speed (injection speed) of the screw 42 relative to the barrel 41, the greater a reaction force the screw 42 receives from the material (injection pressure acting on the force detector 80 and dummy member 81) becomes. Thus, the control unit 14 of the present embodiment controls servomotors 60 and 65 so that the maximum injection speed can be achieved within a range where forces detected by the force detector 80 do not exceed the tolerance, that is, a range where forces applied to the first and second force transmission units 77 and 78 do not exceed the tolerance. In this way, protection (or prevention of overloading) of servomotors 60 and 65 and speed-up of injection operation can be reconciled.

Figure 5:
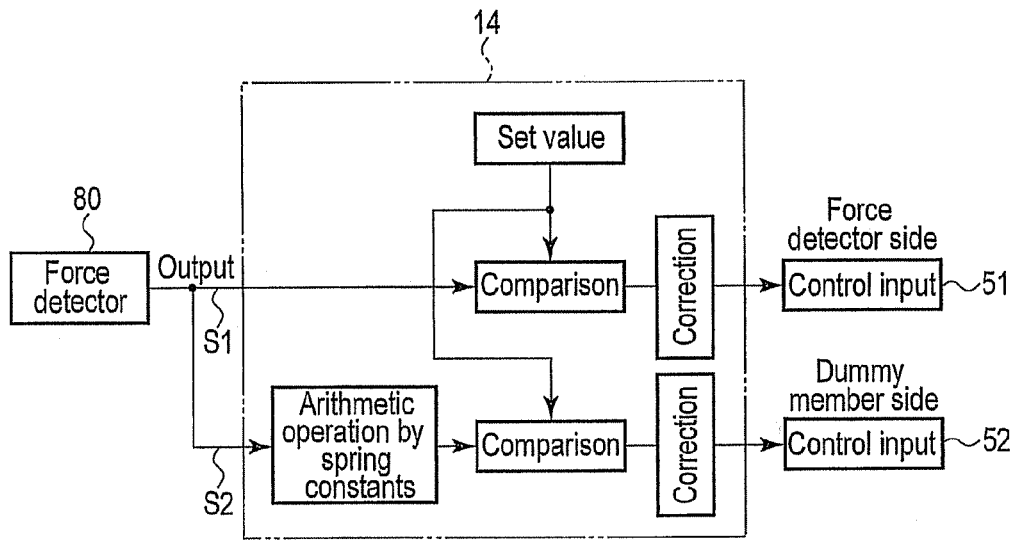
FIG. 5 is a diagram showing respective control inputs of a force detector and dummy member of an injection device according to a second embodiment of the present invention.

In a control unit 14 of a second embodiment shown in FIG. 5, a first output S1 of a force detector 80 is compared with a set value for correction (correction operation) and input to a servomotor 60 of a first injection drive mechanism 51. A second output S2 of the force detector 80 is input to a servomotor 65 of a second injection drive mechanism 52 in such a manner that a value obtained by tempering the second output S2 with an arithmetic operation performed in consideration of a spring constant $K_M$ of the force detector 80 and a spring constant $K_S$ of a dummy member 81 is compared with a set value and correction (correction operation) is performed.

Figure 6:
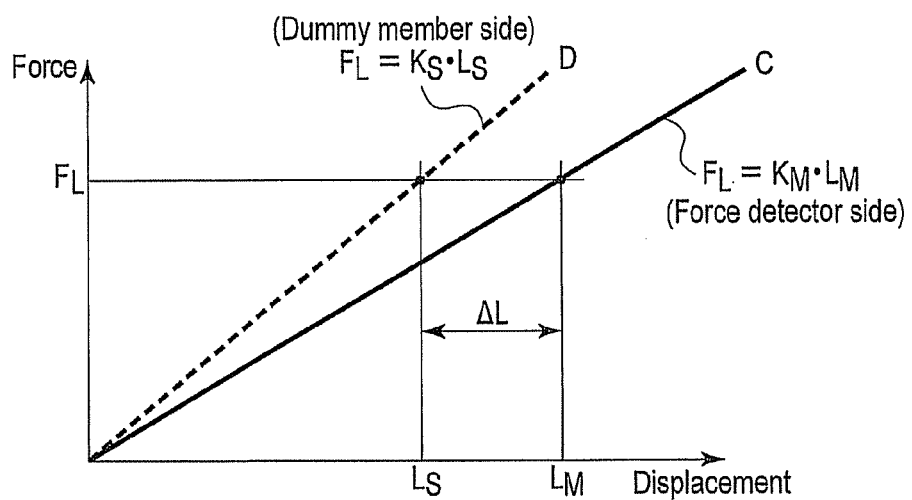
FIG. 6 is a diagram showing the relationships between respective displacements and forces of a force detector and dummy member of an injection device according to a third embodiment of the present invention.

FIG. 6 shows a case where spring constant $K_M$ of the force detector 80 is lower than spring constant $K_S$ of the dummy member 81 (third embodiment). According to Hooke's law, a displacement $L_M$ on the side of the force detector 80 is $L_M=F_L/K_M$. According to Hooke's law, a displacement $L_S$ on the side of the dummy member 81 is $L_S=F_L/K_S$. As in the first embodiment, therefore, a deviation $\Delta L$ between a force transmission unit 77 on the side of the force detector 80 and a force transmission unit 78 on the side of the dummy member 81 can be obtained, and servomotors 60 and 65 are controlled by control inputs taking account of this deviation $\Delta L$.

In the case where injection speed control at the time of injection is changed over to injection pressure control or in the case of pressure control at the time of dwelling or the like, as in the injection speed control, the injection pressure is controlled to be a set pressure by the control described above.

A die-cast molding machine as an example of a molding machine according to a fourth embodiment of the present invention will now be described with reference to FIGS. 7 and 8. If necessary, this example will also be described with reference to the foregoing FIGS. 3 to 6.

Figure 7:
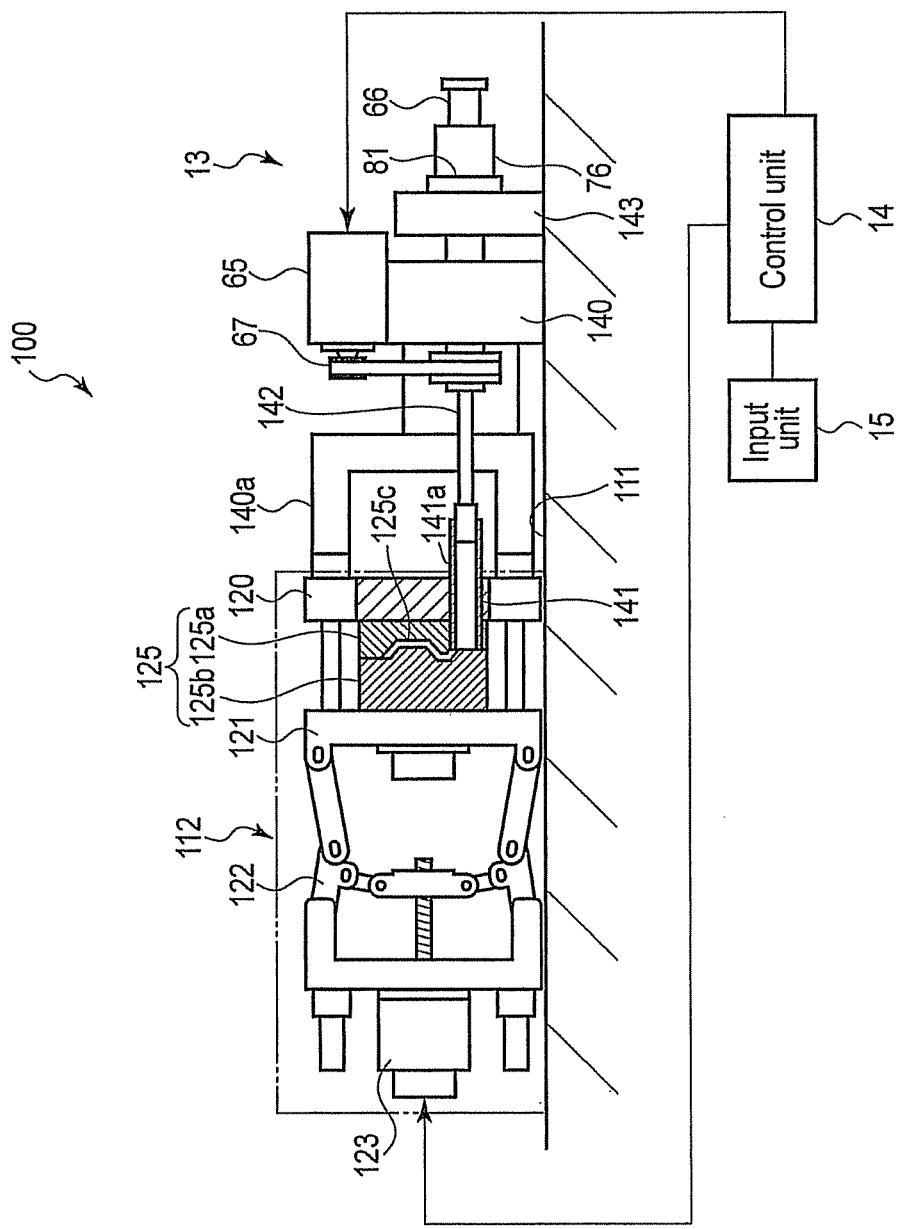
FIG. 7 is a front view, partially in section, showing a molding machine according to a fourth embodiment of the present invention.

FIG. 7 shows an electric die-cast molding machine 100 as an example of the molding machine. The die-cast molding machine 100 will hereinafter be referred to simply as the molding machine 100. This molding machine 100 comprises a base 111, mold clamping device 112, injection device 113, control unit 14, input unit 15, etc. An example of the mold clamping device 112 comprises a stationary platen 120, movable platen 121, open/close drive unit 123, etc. The open/close drive unit 123 causes the link mechanism 122 to advance and retreat the movable platen 121. As a stationary mold 125a and movable mold 125b are joined together, a cavity 125c is formed in a mold 125.

Stationary-side frames 140 and 140a, which constitute part of the injection device 113, are located on the base 111. The injection device 113 comprises the stationary-side frames 140 and 140a, injection unit 141 comprising an injection sleeve 141a, injection plunger 142 inserted into the injection sleeve 141a, movable-side frame 143, etc. The distal end portion of the injection sleeve 141a is inserted into a hole formed in the stationary platen 120. This injection sleeve 141a is supported by the stationary-side frames 140 and 140a through the stationary platen 120. Although the injection device 113 shown in FIG. 7 is located on the base 111, the injection device 113 may alternatively be located on a stand separated from the base 111. In this case, the stationary platen 120 serves as a stationary-side frame that supports the injection unit 141. In some cases, moreover, the injection device 113 may be joined only to the stationary platen 120 so that it is supported on the stationary platen 120.

Figure 8:
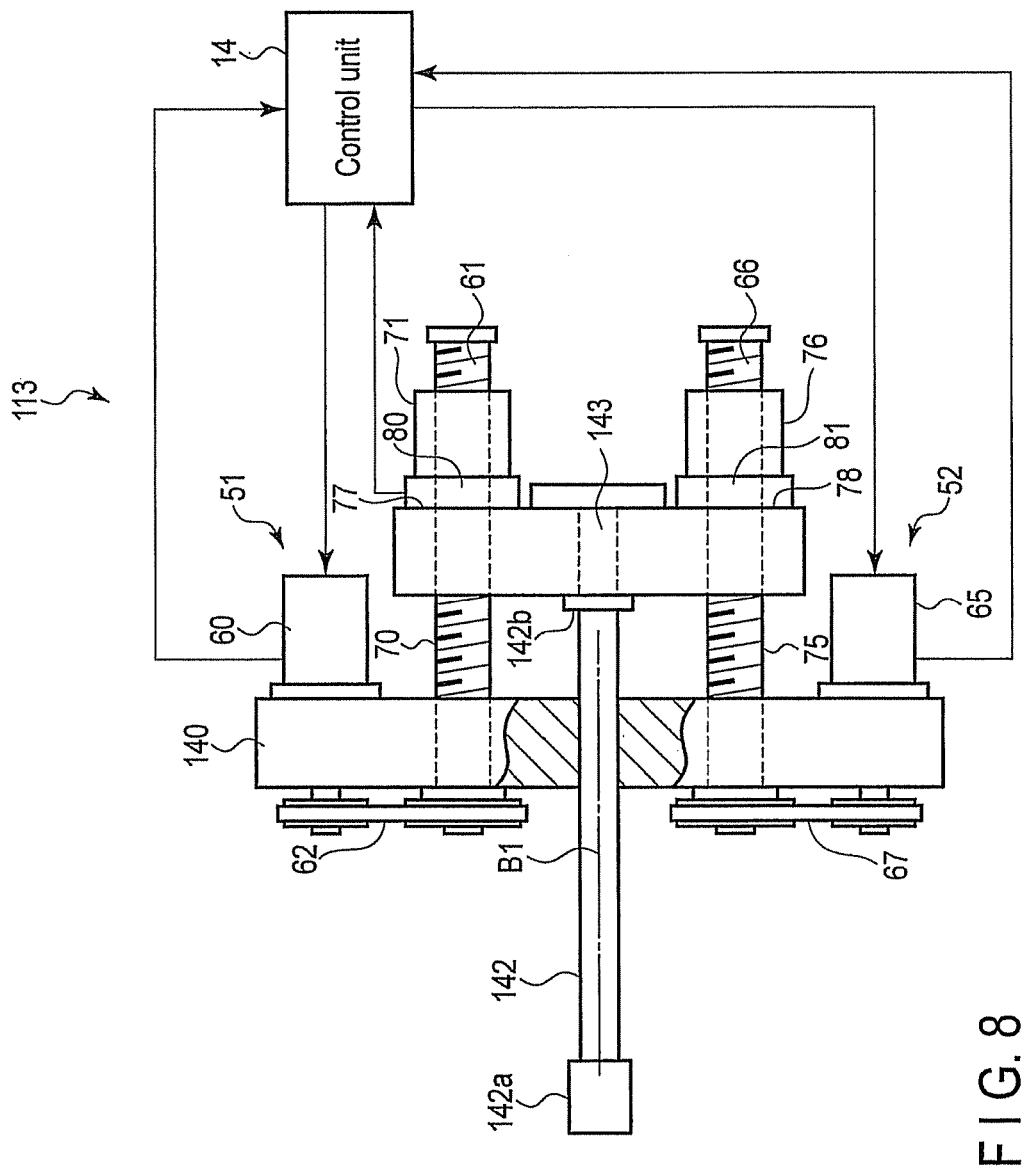
FIG. 8 is a plan view, partially in section, showing part of an injection device of the molding machine shown in FIG. 7.

FIG. 8 is a plan view, partially in section, showing part of the injection device 113. The injection plunger 142 is movable in the direction of an axis B1 of the injection sleeve 141a. The movable-side frame 143 is movable relative to the stationary-side frame 140 in the direction of the axis B1. The injection plunger 142 is an example of an extrusion member. A tip 142a to be inserted into the injection sleeve 141a is disposed on the distal end of the injection plunger 142. A proximal portion 142b of the injection plunger 142 is supported by the movable-side frame 143. This injection device 113 may comprise, for example, an accumulator (not shown) to make up for the injection speed at the time of high-speed injection, injection pressure at the time of dwelling, etc.

The mold clamping device 112 is located in front of the injection sleeve 141a. In this specification, the advance of the movable-side frame 143 implies a movement of the movable-side frame 143 toward the stationary-side frame 140. The retreat of the movable-side frame 143 implies a movement of the movable-side frame 143 away from the stationary-side frame 140.

This injection device 113 comprises first and second injection drive mechanisms 51 and 52. The first and second injection drive mechanisms 51 and 52 move the injection plunger 142 in the direction of the axis B1. Since the configurations and functions of the first and second injection drive mechanisms 51 and 52 are shared by the injection drive mechanisms 51 and 52 described in connection with the first embodiment (FIGS. 1 and 2), common numbers are used to designate corresponding portions common to them, and a description of those portions is omitted.

The injection device 113 constructed in this manner is controlled by the control unit 14. For example, a material from a melting furnace (not shown) is metered by means of a ladle of a pouring device (not shown). The material metered by the ladle is poured into the injection sleeve 141a. As the injection plunger 142 inserted into the injection sleeve 141a is advanced thereafter, the material is injected into the cavity 125c. Further, the movable mold 125b is opened or closed relative to the stationary mold 125a by advancing or retreating the movable platen 121 by means of the mold clamping device 112.

Specifically, a series of molding cycles, including mold closing, injection, dwelling, mold opening, etc., is repeated in a predetermined order, based on a sequential program stored in the control unit 14. At the time of injection, the injection plunger 142 advances in the direction of the axis B1.

This injection device 113 of the fourth embodiment, like the injection device 13 of the first embodiment, controls the injection speed, injection pressure, etc. Also in this case, a force detected by a force detector 80 (output of the force detector 80), spring constant of the force detector 80, and displacement of the force detector 80 are assumed to be $F_L$, $K_M$ and $L_M$, respectively. On the other hand, the spring constant of a dummy member 81 and the displacement of the dummy member 81 are assumed to be $K_S$ and $L_S$, respectively.

FIG. 3 shows a case where spring constant $K_M$ of the force detector 80 is higher than spring constant $K_S$ of the dummy member 81. Segment C in FIG. 3 represents the load-deflection characteristic of the force detector 80. Segment D in FIG. 3 represents the load-deflection characteristic of the dummy member 81.

In the first injection drive mechanism 51 comprising a first ball screw 61 and force detector 80, as in the present embodiment, the displacement $L_M$ of the force detector 80 depends on spring constant $K_M$ of the force detector 80. Specifically, according to Hooke's law, the displacement $L_M$ of the force detector 80 is given by $$F_L=K_M L_M,$$

$$L_M=F_L/K_M.$$

In the second injection drive mechanism 52 comprising a second ball screw 66 and the dummy member 81, on the other hand, the displacement $L_S$ of the dummy member 81 depends on spring constant $K_S$ of the dummy member 81. Specifically, according to Hooke's law, the displacement $L_S$ of the dummy member 81 is given by $$F_L = K_S \cdot L_S,$$

$$L_S = F_L/K_S.$$

Thus, a deviation $\Delta L$ between a force transmission unit 77 on the side of the force detector 80 and a force transmission unit 78 on the side of the dummy member 81 is $$\Delta L = L_M - L_S = (F_L/K_M) - (F_L/K_S) = F_L \cdot \{(1/K_M) - (1/K_S)\}.$$

In order to apply equal forces to the first force transmission unit 77 and second force transmission unit 78, therefore, it is necessary to take account of the difference between the spring constant on the side of the force detector 80 and the spring constant on the side of the dummy member 81, that is, the deviation $\Delta L$. Thus, as regards a command for the second injection drive mechanism 52, the control unit 14 outputs a command for the first injection drive mechanism 51 tempered with the deviation $\Delta L$, as the command for the second injection drive mechanism 52, to a servomotor 65. If a command (or control input) on the side of the force detector 80 is X, a command (or control input) on the side of the dummy member 81 is $X - F_L \cdot \{(1/K_M) - (1/K_S)\}$ at the time of both injection and metering.

Thus, the control unit 14 of the injection device 13 of the present embodiment controls a servomotor 60 of the first injection drive mechanism 51 based on the output of the force detector 80 and also controls servomotor 65 of the second injection drive mechanism 52 based on the output of the force detector 80 and the difference between respective spring constants $K_M$ and $K_S$ of the force detector 80 and dummy member 81.

As shown in FIG. 4, for example, the output of the force detector 80 is compared with a set value and correction (correction operation) is performed. Further, the respective control inputs of servomotor 60 of the first injection drive mechanism 51 and servomotor 65 of the second injection drive mechanism 52 are calculated by performing an arithmetic operation in consideration of spring constants $K_M$ and $K_S$ of the force detector 80 and dummy member 81. Under this control, the injection speed is controlled to be a set speed.

At the time of injection, the higher the movement speed (injection speed) of the injection plunger 142, the greater a reaction force the injection plunger 142 receives from the material (injection pressure acting on the force detector 80 and dummy member 81) becomes. Thus, the control unit 14 controls servomotors 60 and 65 so that the maximum injection speed can be achieved within a range where forces detected by the force detector 80 do not exceed the tolerance, that is, a range where forces applied to the first and second force transmission units 77 and 78 do not exceed the tolerance. In this way, protection (or prevention of overloading) of servomotors 60 and 65 and speed-up of injection operation can be reconciled.

In the control unit 14 of the fourth embodiment, as in the second embodiment shown in FIG. 5, a first output S1 of the force detector 80 may be compared with a set value for correction (correction operation) and input to servomotor 60 of the first injection drive mechanism 51. A second output S2 of the force detector 80 is input to servomotor 65 of the second injection drive mechanism 52 in such a manner that a value obtained by tempering the second output S2 with an arithmetic operation performed in consideration of a spring constant $K_M$ of the force detector 80 and a spring constant $K_S$ of the dummy member 81 is compared with a set value and correction (correction operation) is performed.

As shown in FIG. 6, moreover, this arrangement is applicable to a case where spring constant $K_M$ of the force detector 80 is lower than spring constant $K_S$ of the dummy member 81. According to Hooke's law, a displacement $L_M$ on the side of the force detector 80 is $L_M = F_L/K_M$. According to Hooke's law, a displacement $L_S$ on the side of the dummy member 81 is $L_S = F_L/K_S$. As in the first embodiment, therefore, a deviation $\Delta L$ between force transmission unit 77 on the side of the force detector 80 and force transmission unit 78 on the side of the dummy member 81 can be obtained. Servomotors 60 and 65 are controlled by control inputs taking account of this deviation $\Delta L$.

In the case where injection speed control at the time of injection is changed over to injection pressure control or in the case of pressure control at the time of dwelling or the like, as in the injection speed control, the injection pressure is controlled to be a set pressure by the control described above.

In a drive mechanism constructed so that ball nuts are rotated by the servomotors or the like to axially advance or retreat ball screw shafts through the relative rotation of the ball nuts, for example, the first and second force transmission units may sometimes be disposed in positions where a thrust produced by the relative rotation of the ball nuts is transmitted, depending on the drive system of the movable-side frame 43. In this case, a force detector such as a load cell and the like is attached to one of the force transmission units, and a dummy member to the other force transmission unit.

In a drive mechanism constructed so that the ball screw shafts are rotated by the servomotors or the like and the ball nuts are disposed on the stationary frame, whereby the ball screw shafts are advanced or retreated together with the movable-side frame, the first and second force transmission units may sometimes be disposed in positions where a thrust produced by the relative rotation of the ball screw shafts is transmitted. Also in this case, a force detector such as a load cell and the like is attached to one of the force transmission units, and a dummy member to the other force transmission unit. In short, the force detector and dummy member should only be attached individually to one and the other of the pair of force transmission units that transmit the thrust produced by the relative rotation of the ball screw shafts and ball nuts.

As described above, the control unit 14 of the present embodiment controls servomotors 60 and 65 of the first and second injection drive mechanisms 51 and 52 so that the forces applied to the first and second force transmission units 77 and 78 are equalized, based on the respective spring constants of the force detector 80 and dummy member 81. Further, the control unit 14 of the present embodiment is incorporated with computer programs for controlling servomotors 60 and 65 such that the injection speed is maximal within the range where the forces applied to the first and second force transmission units 77 and 78 do not exceed the tolerance.

Further, the control unit 14 of the present embodiment is incorporated with computer programs such that the injection pressure, as well as the injection speed, is controlled by controlling servomotors 60 and 65.

Furthermore, the injection operation of the injection device 13 of the present embodiment comprises at least the following processes:

(1) transmitting a thrust produced by relative rotation of a ball screw shaft 70 and ball nut 71 of the first ball screw 61 to the movable-side frame 43 or 143 through the force detector 80 disposed on the first force transmission unit 77;

(2) transmitting a thrust produced by relative rotation of a ball screw shaft 75 and ball nut 76 of the second ball screw 66 to the movable-side frame 43 or 143 through the dummy member 81 disposed on the second force transmission unit 78;

(3) outputting a signal corresponding to a force applied to the force detector 80;

(4) deforming the dummy member 81 depending on a force applied to the dummy member 81; and (5) controlling servomotor 60 of the first injection drive mechanism 51 based on the output of the force detector 80 and controlling servomotor 65 of the second injection drive mechanism 52 based on the output of the force detector 80 and the difference between the respective spring constants of the force detector 80 and dummy member 81.

According to the present invention, moreover, the forces applied to the first force transmission unit 77 and second force transmission unit 78 are equalized, based on the spring constant of the force detector 80, such as a load cell and the like, and the spring constant of the dummy member 81. Accordingly, there is no possibility of an excessive output being produced in only one of the servomotors, so that the ball screws and servomotors can be prevented from being overloaded. Thus, the ball screws and servomotors can be prevented from being damaged, so that the durability of the drive mechanisms is improved. In this way, moreover, the frequency of maintenance can be reduced, and reduction of the rate of molding operation due to maintenance can be prevented. Consequently, the rate of molding operation, that is, the availability of production of molded articles, can be improved while suppressing maintenance costs.

In the present invention, moreover, servomotors 60 and 65 are controlled so that the maximum injection speed can be achieved within the range where the forces applied to the first and second force transmission units 77 and 78 do not exceed the tolerance. In this way, protection (or prevention of overloading) of servomotors 60 and 65 and speed-up of injection operation can be reconciled. In this way, moreover, the durability of the drive mechanisms is increased, the frequency of maintenance can be reduced, and reduction of the rate of molding operation due to maintenance of the servomotors and the like can be prevented. Consequently, the rate of molding operation, that is, the availability of production of molded articles, can be improved while suppressing the maintenance costs of the servomotors and the like.

It is to be understood, in carrying out the present invention, that the specific forms of the various elements that constitute the injection device, including the specific configurations of the molding machine that constitutes the injection device, may be variously modified as required.

The first to third embodiments described above are molding machines comprising an in-line injection device. As shown in FIG. 1, the in-line injection device is designed so that a plasticizing unit configured to melt and plasticize the material and an injection unit configured to inject the material toward the cavity of a mold are formed integrally with each other. However, the present invention is not limited to the in-line injection device. For example, the present invention can be applied to the injection unit of a preplasticizing injection device. The preplasticizing injection device comprises a plasticizing unit configured to melt and plasticize the material and an injection unit separate from the plasticizing unit and configured to inject the material toward the cavity of a mold, the plasticizing unit and the injection unit communicating with each other. The extrusion member of this preplasticizing injection device may be either a screw, such as that shown in FIG. 2, or an injection plunger, such as that shown in FIG. 8.

The present invention can also be applied to injection devices comprised a pair of ball screws other than the injection molding machine. Further, the present invention can also be applied to molding machines, such as compression molding machines (press-molding machines), transfer molding machines, extrusion molding machine, and the like, other than the injection molding machine and die-cast molding machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection device comprising:
   a stationary-side frame supporting an injection unit;
   a movable-side frame being movable relative to the stationary-side frame and supporting an extrusion member inserted into the injection unit;
   first and second ball screws each comprising a ball screw shaft and a ball nut for longitudinally moving the movable-side frame relative to the stationary-side frame;
   a first injection drive mechanism comprising a first servomotor configured to relatively rotate the ball screw shaft and the ball nut of the first ball screw;
   a second injection drive mechanism comprising a second servomotor configured to relatively rotate the ball screw shaft and the ball nut of the second ball screw;
   a first force transmission unit configured to transmit a thrust produced by the relative rotation of the ball screw shaft and the ball nut of the first ball screw to the movable-side frame;
   a force detector disposed on the first force transmission unit and configured to produce an output corresponding to a force applied to the first force transmission unit;
   a second force transmission unit configured to transmit a thrust produced by the relative rotation of the ball screw shaft and the ball nut of the second ball screw to the movable-side frame;
   a dummy member disposed on the second force transmission unit and having such a property as to be deformable depending on a force applied to the second force transmission unit; and
   a control unit configured to control the first servomotor based on the output of the force detector and control the second servomotor by determining a command to the second servomotor so that the forces applied to the first and second force transmission units are equalized, based on the output of the force detector and spring constants of the force detector and the dummy member.

2. The injection device according to claim 1, wherein the control unit controls an injection speed within a range where the forces applied to the first and second force transmission units do not exceed a tolerance.

3. A molding machine comprising:
   the injection device according to claim 1; and
   a mold clamping device comprising a stationary platen, a movable platen, and an open/close drive unit for moving the movable platen in a mold clamping direction and a mold opening direction.

4. A molding machine comprising:
the injection device according to claim 2; and
a mold clamping device comprising a stationary platen, a movable platen, and an open/close drive unit for moving the movable platen in a mold clamping direction and a mold opening direction.

5. A method for controlling an injection device, which comprises a stationary-side frame supporting an injection unit, a movable-side frame supporting an extrusion member inserted into the injection unit, first and second ball screws each comprising a ball screw shaft and a ball nut for moving the movable-side frame relative to the stationary-side frame, and first and second injection drive mechanisms configured to rotate the ball screws, the control method for an injection device comprising:
transmitting a thrust produced by relative rotation of the ball screw shaft and the ball nut of the first ball screw to the movable-side frame through a force detector disposed on the first force transmission unit;
transmitting a thrust produced by relative rotation of the ball screw shaft and the ball nut of the second ball screw to the movable-side frame through a dummy member disposed on the second force transmission unit;
outputting a signal corresponding to a force applied to the force detector by means of the force detector;
deforming the dummy member depending on a force applied to the dummy member; and
controlling the first injection drive mechanism based on the output of the force detector and controlling the second injection drive mechanism by determining a command to the second servomotor so that the forces applied to the first and second force transmission units are equalized, based on the output of the force detector and spring constants of the force detector and the dummy member.

6. The control method according to claim 5, wherein an injection speed is controlled within a range where the forces applied to the first and second force transmission units do not exceed a tolerance.

\* \* \* \* \*